July 13, 1926.
L. J. MORGAN
FOLDING AUTOMOBILE SEAT
Filed August 19, 1922
1,592,465
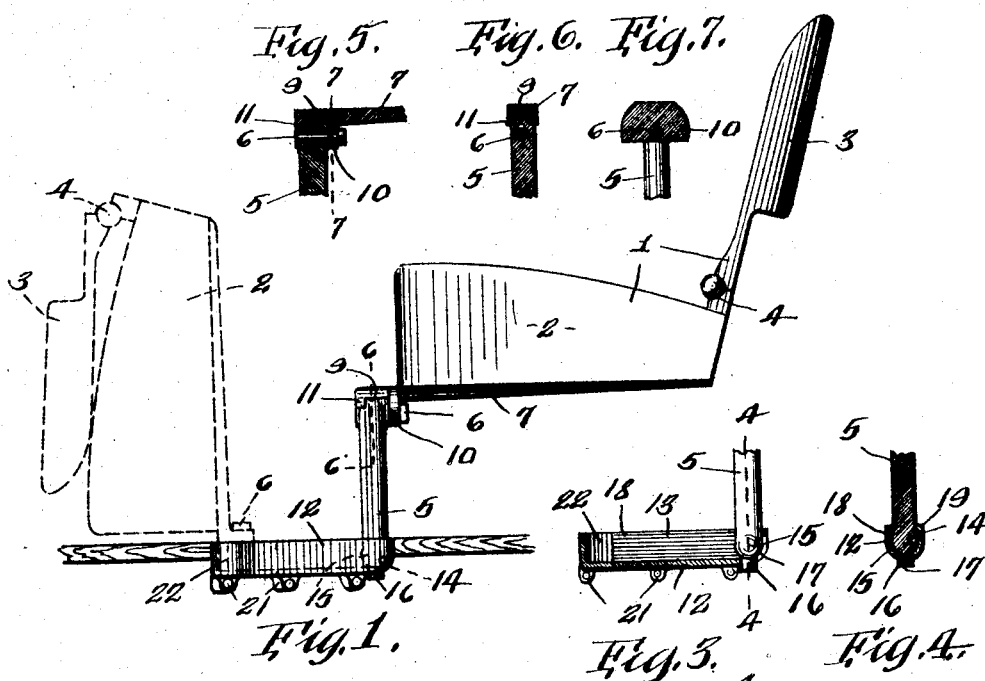
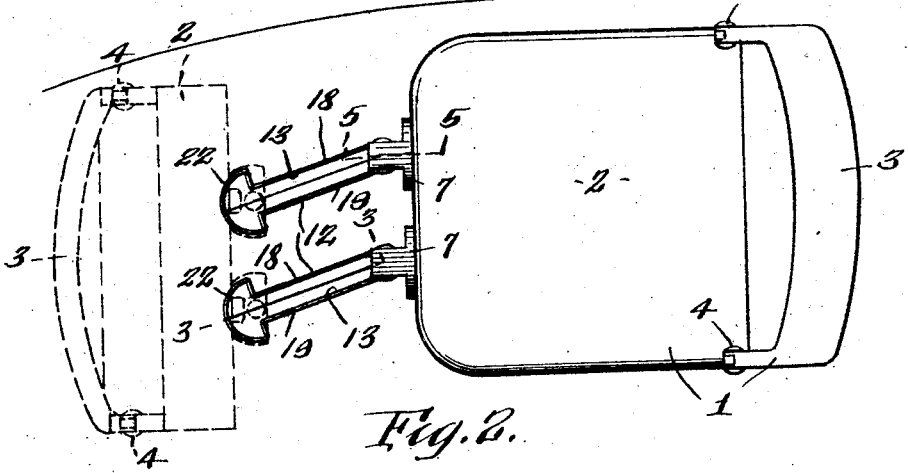
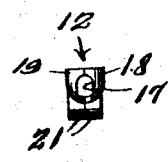
INVENTOR.
BY
ATTORNEYS.

Patented July 13, 1926.

1,592,465

UNITED STATES PATENT OFFICE.

LEWIS J. MORGAN, OF SYRACUSE, NEW YORK.

FOLDING AUTOMOBILE SEAT.

Application filed August 19, 1922. Serial No. 582,904.

This invention relates to folding automobile seats, and has for its object a particularly simple and efficient construction by which the seat tilts or folds inwardly and forwardly toward the central vertical plane of the automobile body.

The invention consists in the novel features and in the combinations and constructions hereinafter set forth and claimed.

In describing this invention, reference is had to the accompanying drawings in which like characters designate corresponding parts in all the views.

Figure 1 is a side elevation of this folding seat, the contiguous portion of the floor of an automobile being shown, and also, the position of the seat when in its folded position being shown in dotted lines.

Figure 2 is a plan view of parts seen in Fig. 1, the position of the tapering side of the automobile body being shown.

Figure 3 is a fragmentary sectional view on line 3—3, Fig. 2.

Figure 4 is a sectional view on line 4—4, Fig. 3.

Figure 5 is a sectional view on the plane of the line 5—5, Fig. 2.

Figure 6 is a fragmentary sectional view on line 6—6, Fig. 1.

Figure 7 is a fragmentary sectional view on line 7—7, Fig. 5.

Figure 8 is an end elevation of one of the base pieces.

This folding automobile seat or chair comprises a body, a base, support, standard or leg or legs connected to the body and to the base, it being hinged to the base on an axis or pivot extending in a transverse plane arranged at an oblique angle to the central forwardly and rearwardly extending vertical plane of the body so that when the support carrying the body is folded downwardly and forwardly, the body at the same time swings inwardly toward the central longitudinal plane of the vehicle instead of forwardly in a straight line parallel to the central plane of the vehicle body.

1 designates the chair which includes a body or seat 2 and a back 3 which is also preferably hinged to the seat at 4. The support for the body as here shown comprises a pair of legs 5 hinged at 6 to the body near the front end thereof, the hinges 6 extending forwardly and rearwardly parallel to each other and parallel to the central forwardly and rearwardly extending plane of the body 2.

As here illustrated, the body is formed with brackets 7 on the lower side thereof, each of which is formed with a recess and the upper end of each leg extends into the said recess at 9 and the pivot 6 extends through a flange 10 depending from the bracket at the rear side of the recess. Also, the bracket is formed with a shorter depending flange 11 opposed to the rear wall of the recess 8 and extending over the front side of the upper end of the leg.

The base for the chair as here illustrated comprises two pieces 12 set into the floor of the vehicle body and formed with channels 13 which extend in parallel planes arranged at oblique angles to the central longitudinal vertical plane of the body 2, and the legs 5 are hinged in the rear ends of these channels upon axes extending in transverse planes at a right angle to the planes of channels and at oblique angles to the vertical central longitudinal plane of the body 2 and the vertical planes of the hinge pins 6.

As here illustrated, the channels are formed with sockets 14 at their rear ends and the legs 5 with balls 15 at their lower ends arranged in the sockets; and the legs are guided in their folding movement into the channels by means comprising a radial pin 16 on each of the legs and a slot 17 in each base piece, these pins extending into the slots and the slots being in line with the channels 13.

Each of the base pieces 12 is shown as composed of two sections 18, 19 which are held together in any suitable manner as by screws extending through depending lugs 21 on the lower sides thereof. Also, the pieces 12 are formed with enlargements 22 at their front ends for receiving the joints connecting the front ends of the brackets 7 and the upper ends of the legs 5. Also, the depending flanges 10 are shaped to form a cover for these enlargements 22.

The sides of the bodies of motor vehicles taper in a curve forwardly, and owing to the tapering of the sides, the front seat cannot be folded forwardly and at the same time occupy a position close to the sides of the body when in its normal unfolded position.

By my folding chair or seat, the seat normally occupies a position close to the side wall of the body and when folded forwardly also moves inwardly to conform to the taper or inward curve of the side wall of the body.

In operation, in folding the seat, the back is first folded down onto the seat upon its hinge 4 and then the seat is tilted forwardly and moves inwardly and forwardly into the position shown in dotted lines, Figs. 1 and 2, the legs 5 fitting into the channels 13 and the pins 16 and slots 17 guiding the seat during its movement inwardly. Also, during such folding movement, the legs move about the axis 6 connecting their upper ends to the body 2 so that the legs maintain their parallel position during the folding operation.

When the seat is in its normal or unfolded position, the pins 16 engaging the front ends of the slots 17 hold the seat in upright position as the weight of the seat is in the rear of the legs 5.

What I claim is:

1. A folding vehicle seat comprising a body, a base, legs near the front edge of the body, the legs being arranged in a plane extending transversely of the body and at the right angle to the central longitudinal plane of the vehicle, the legs being hinged to the base and to the body and the base and the legs being formed with coacting means causing the legs and body to move in an oblique direction relative to the central vertical lengthwise plane of the seat body when being moved into and out of its normal position.

2. A folding automobile seat comprising a body, legs near the front end of the body and connected thereto by pivots extending forwardly and rearwardly of the body, and a base, the lower ends of the legs being hinged to the base on parallel axes arranged at oblique angles to the vertical planes of the axes of the pivots connecting the legs and the body, substantially as and for the purpose set forth.

3. A folding chair for automobiles comprising a body, legs hinged at their upper ends near the front end of the body on axes extending forwardly and rearwardly of the body, and a base formed with socket, the legs having balls at their lower ends located in the sockets and also radially extending pins and the sockets being formed with slots for receiving the pins, the slots being arranged in planes extending at inclined angles to the vertical planes of the pivots connecting the upper ends of the legs and the body, substantially as and for the purpose described.

4. In a folding vehicle seat, a body, a support for the body and a base to which the support is pivoted, the support being pivoted to the body to hold the body substantially parallel to the central longitudinal vertical plane of the vehicle during folding and unfolding of the seat, the axis of the pivot connecting the support and the base being arranged in a transverse vertical plane extending at an inclined angle to said central longitudinal plane of the vehicle, all whereby the support and seat swing in an oblique direction during folding and unfolding of the seat and the seat body during such oblique movement maintains the position parallel to the central plane of the vehicle.

5. In a folding automobile chair embodying legs hinged to the body near the front end thereof on parallel axes extending forwardly and rearwardly parallel to the central plane of the body, and a base formed with channels extending obliquely relatively to said central vertical plane, the base being formed with sockets at the rear ends of the channels and with slots extending in line with the channels and the legs having balls at their lower ends in said sockets and radial pins extending into the slots, substantially as and for the purpose described.

In testimony whereof, I have hereunto signed my name, at Syracuse, in the county of Onondaga and State of New York, this 2nd day of August, 1922.

LEWIS J. MORGAN.